United States Patent [19]

Yanker

[11] Patent Number: 5,075,673
[45] Date of Patent: Dec. 24, 1991

[54] VARIABLE SPEED, IMAGE PAN METHOD AND APPARATUS

[75] Inventor: Peter C. Yanker, Portola Valley, Calif.

[73] Assignee: International Business Machines Corp., Armonk, N.Y.

[21] Appl. No.: 367,172

[22] Filed: Jun. 16, 1989

[51] Int. Cl.⁵ .................. G09G 1/00; G09G 1/16; G09G 1/06

[52] U.S. Cl. ............................ 340/710; 340/709; 340/724

[58] Field of Search .............. 340/709, 724, 726, 706, 340/721

[56] References Cited

U.S. PATENT DOCUMENTS

| | | | |
|---|---|---|---|
| 4,070,710 | 1/1978 | Sukonick et al. | 340/724 |
| 4,442,495 | 4/1984 | Sukonick | 340/726 |
| 4,521,772 | 6/1985 | Lyon | 340/710 |
| 4,533,910 | 8/1985 | Sukonick et al. | 340/721 |
| 4,543,571 | 9/1985 | Bilbrey et al. | 340/710 |
| 4,618,859 | 10/1986 | Ikeda | 340/724 |
| 4,714,918 | 12/1987 | Barker et al. | 340/709 |
| 4,720,703 | 1/1988 | Schnarel, Jr. et al. | 340/709 |
| 4,734,685 | 3/1988 | Watanabe | 340/706 |
| 4,734,689 | 3/1988 | Kurakake | 340/726 |
| 4,940,970 | 7/1990 | Fujisaku | 340/724 |

*Primary Examiner*—Alvin E. Oberley
*Assistant Examiner*—Steve Saras
*Attorney, Agent, or Firm*—Perman & Green

[57] ABSTRACT

A display apparatus is described having the capability to pan a viewport image across a world-plane image. The viewport image has defined boundaries and exhibits a cursor whose position is movable by a user operated mouse or keyboard controls. The invention comprises a method for providing a variable-rate pan action of the viewport image which includes panning the viewport image at a preset rate in the direction of a first viewport boundary, if the cursor has been moved to the first boundary. The viewport image is panned at a proportionally faster rate in the direction of the first viewport boundary, as the cursor is moved further beyond the first viewport boundary thus enabling a variable speed pan under user control.

10 Claims, 2 Drawing Sheets

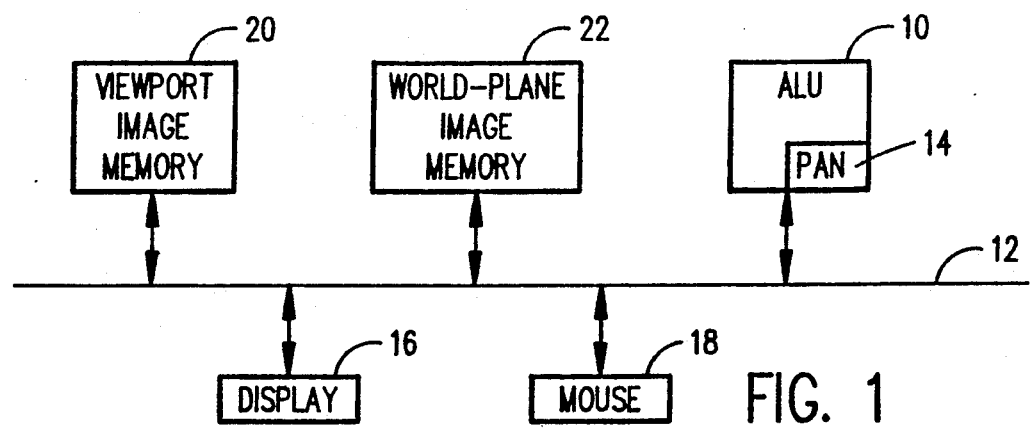
FIG. 1
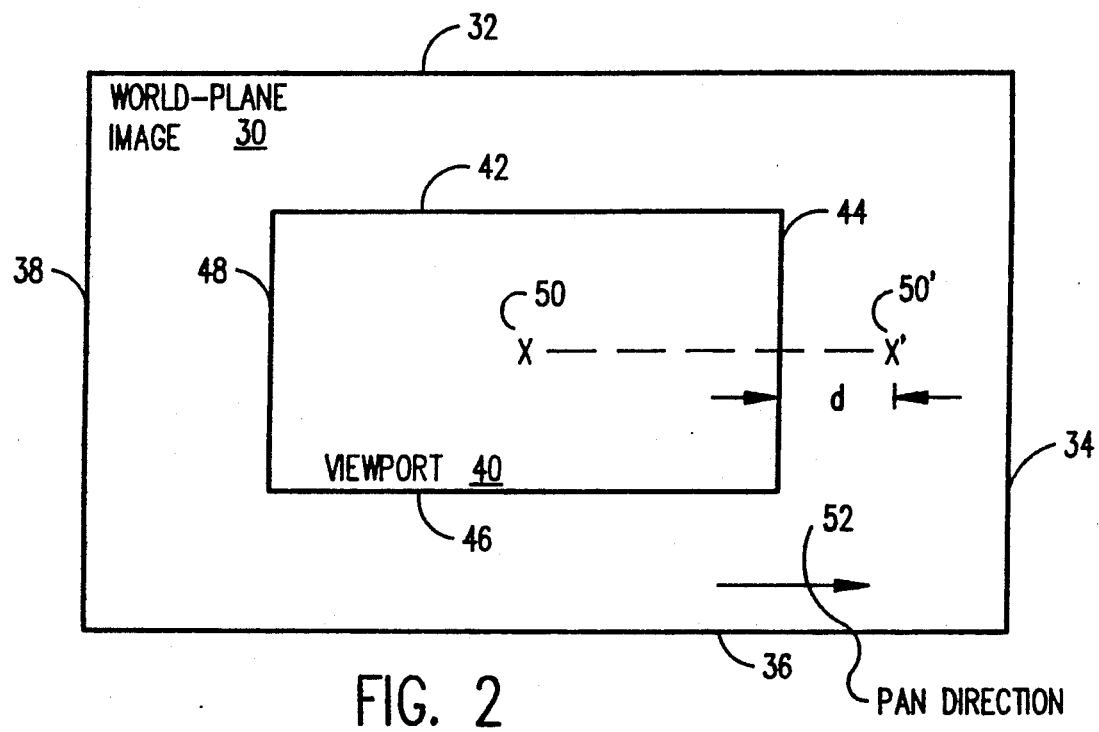
FIG. 2
PAN RATE TABLE
| DIST & (PELS) | PAN RATE PELS/SEC | MOVEMENT PER MAN MOVE (PELS) |
|---|---|---|
| 0 | 1 | 5 |
| 5 | 2 | 5 |
| 10 | 3 | 10 |
| 20 | 4 | 10 |
| . | . | . |
| . | . | . |
| . | . | . |
FIG. 3

VARIABLE SPEED, IMAGE PAN METHOD AND APPARATUS

FIELD OF THE INVENTION

This invention relates to the control of movement of an image on a display terminal and, more particularly, to a cursor controlled, variable rate, image panning method and apparatus.

BACKGROUND OF THE INVENTION

In graphics display terminals, it is known to provide a plurality of memories for various display fields. One such memory is termed a viewport memory and contains the storage necessary to hold a pixel image for one "screen" of the display. Another such memory is termed the "world-plane" memory and contains sufficient storage for all pixels in a complete graphics image. Ordinarily, the world-plane image is considerably larger than the image displayed through the viewport memory, with the viewport only showing a portion of the world-plane. Under user control of a keyboard or other instrumentality, the viewport may be shifted from place to place within the world-plane to display images contained in the world-plane.

In the U.S. Pat. No. 4,720,703 to Schnarel, Jr. et al, an apparatus and method for panning a viewport image across a world-plane image is disclosed. Schnarel et al employ a cursor to enable the panning of the viewport relative to the world-plane image. As long as the cursor is within the viewport, it is employed in the standard manner. When, however, the cursor is moved outside the viewport, the viewport is panned to include the cursor. By "panning" is meant moving the viewport in a measured manner to cause it to scan from one location to another with the cursor just being brought within the viewport before the panning ceases.

In present-day graphics systems, Zoom features are included which enable the "blow-up" of discrete areas of the world-plane image. When in the Zoom mode, the panning of the viewport across a world-plane image may consume considerable time. Even in non-Zoom displays, it is often desirable to rapidly pan the viewport to enable rapid examination of various parts of the world-plane image, while also providing slower pan rates for detailed examination of the image. Thus, the viewport should be made "pannable" at different rates of speed, depending upon the user's desire. It is further preferable that the panning control be as simply implemented as possible to enable user-friendly operation of the display function.

Accordingly, it is an object of the invention to provide a system and method for panning a viewport at variable speeds across a world-plane image.

It is another object of this invention to enable a variable speed pan feature for a display wherein a single cursor control device also controls the panning action.

SUMMARY OF THE INVENTION

A display apparatus is described having the capability to pan a viewport image across a world-plane image. The viewport image has defined boundaries and exhibits a cursor whose position is movable by a user operated mouse or keyboard controls. The invention comprises a method for providing a variable-rate pan action of the viewport image which includes panning the viewport image at a preset rate in the direction of a first viewport boundary, if the cursor has been moved to the first boundary. The viewport image is panned at a proportionally faster rate in the direction of the first viewport boundary, as the cursor is moved further beyond the first viewport boundary thus enabling a variable speed, user controlled, pan.

BRIEF DESCRIPTION OF THE DRAWINGS

FIG. 1 is a high level block diagram of a display terminal which includes the means to perform the method of the invention.

FIG. 2 is a schematic showing of a world-plane image on which a viewport has been superimposed, indicating the relationship therebetween.

FIG. 3 is a table showing various pan rates which are dependent upon the distance the user has moved the cursor outside of the viewport's limits.

DETAILED DESCRIPTION OF THE INVENTION

Figure 4:
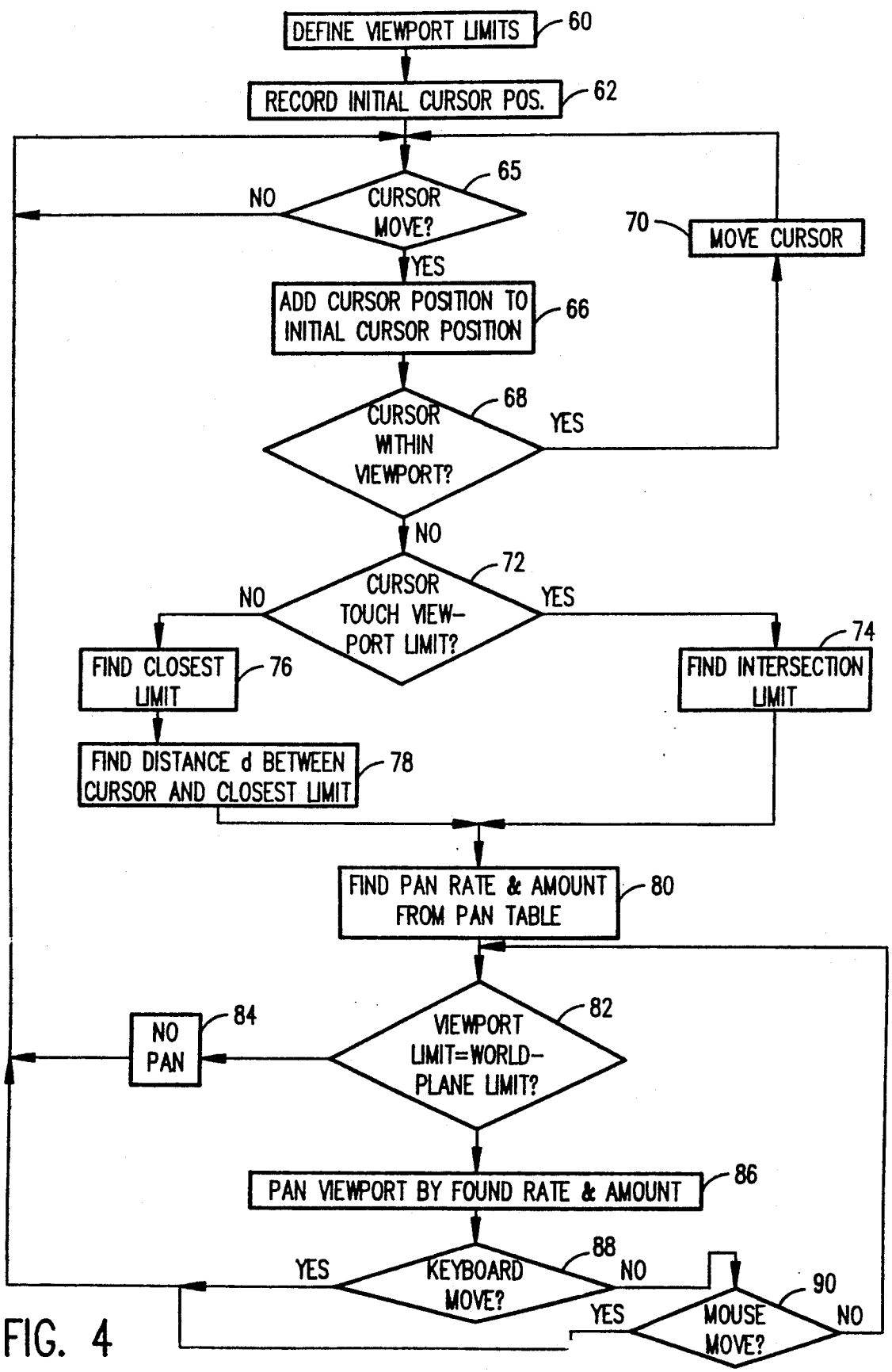
FIG. 4 is a high level flow diagram illustrating the operation of the invention in conjunction with the system shown in FIG. 1.

In FIG. 1, arithmetic logic unit (ALU) 10 is connected to a bus structure 12 that provides the major communication links between the various sub-components of a display terminal. ALU 10 also contains within it, a sub-area (e.g. the area schematically shown at 14) which includes subroutine that enables the pan action to occur. A display 16 is also connected to bus 12 and contains (not shown) a cathode-ray tube or other display instrumentality for providing graphics and alpha-numeric images. Display 16 also, in the known manner, indicates a cursor on its face, which cursor is movable through the action of a mouse 18 or other keyboard controls (not shown).

Ordinarily, ALU 10 will also have associated therewith both RAM and disk memories which provide the storage instrumentalities for the system. In this case, those memories have been omitted from FIG. 1, but portions of the RAM are indicated as viewport memory 20 and world-plane memory 22. Viewport memory 20 contains sufficient storage to define each pixel contained within a screen to be shown on display 16. World-plane memory 22 will generally contain an image which can also be shown on display 16, but which is best shown in discrete portions in a magnified manner. For instance, world-plane memory 22 can contain an integrated circuit layout map, with viewport memory 20 being utilized to store a pixel image of a portion of the world-plane for magnified viewing. Viewport memory 20 and world-plane memory 22 generally will form portions of the random access memory in the display terminal.

Referring now to FIG. 2, a world-plane image 30 is shown having its outer boundaries defined by limits 32, 34, 36 and 38. Viewport 40 falls within world-plane image 30 and is defined by viewport limits 42, 44, 46 and 48. Typically, world-plane image 30 may be comprised of 1024×1024 pixels or larger, whereas the viewport may comprise 640 pixels by 480 pixels in the horizontal and vertical directions, respectively. If a "Zoom" feature is employed by the display terminal, the pixels shown in viewport 40 will generally not correspond to the pixels of world-plane image 30 but, in fact, will be considerably larger in size than the pixels used in world-plane image 30. Thus, the actual size of the image viewed in viewport 40 may be only comprise a very small portion of world-plane image 30.

A cursor 50 is present in both viewport 40 and world-plane image 30 at exactly identical positions within the images. The position of cursor 50 is controllable in the known manner, by mouse 18 or by direction arrow keys on the keyboard of display 16. By moving mouse 18 in the direction of viewport limit 44, cursor 50 is caused to move toward the right edge of the screen of display 16. When, as will be discussed below, cursor 50 arrives at limit 44, the viewport image 40 begins to pan to the right in the direction shown by arrow 52. If the user continues to move mouse 18 to the right, causing cursor 50 to move further outside viewport 40 (e.g. to point shown by cursor 50') then the system recognizes that fact and causes viewport 40 to pan at a faster rate than it would pan if the user just maintained cursor 50 at limit 44. Thus, while the user is unable to actually see cursor 50 move off of the screen by continuing to move mouse 18 in the direction of arrow 52, the rate of pan can be increased accordingly. It should be noted that cursor 50' is to the right of limit 44 by a distance "d". The distance d is repetively "measured" and a table is then accessed to determine the pan rate associated therewith.

The pan operation occurs within the system of FIG. 1 by causing columns or rows of pixels to be added to the viewport limit in the direction of the pan, and for columns or rows of pixels (or the case may be) to be subtracted from the opposite image limit. In specific, if viewport 40 is being panned in the direction of arrow 52 in FIG. 2, then columns of pixels are added along limit 44 from world plane image memory 22. Similarly, a like number of columns are removed from the area adjacent limit 48 and the entire image is shifted so that it lies within the viewport's limits. The rate of addition of pixel columns and the number of pixel columns added is as shown in FIG. 3.

FIG. 3 illustrates a pan rate table which is stored within "pan" area 14 of ALU 10. The left-most column of the table indicates the distance d of cursor 50' outside of a limit of viewport 40. If distance d is equal to 0, then it is known that cursor 50 is coincident with one of limits 42, 44, 46 and 48. In that case, the middle column defines the pan rate in pels (pixel's or picture elements) per second to be applied to the pan operation. The right most column indicates the amount of movement of viewport 40 per pan action, as measured in pels. For instance, if the distance d is measured at 5 pels, then the pan rate is indicated as 2 pels per second, with each pan movement being 5 pels. Thus, each time the image moves, it is moved 5 pels but at a rate of 2 pels per second, so that every ten seconds there have been two 5 pel movements of the image during that 10 second interval. The pan rate table of FIG. 3 is merely exemplary as to the indicated values and does not come into action until it is determined that the position of cursor 50 is coincident with a limit of viewport 40.

Referring now to FIG. 4, the operation of the variable speed pan will be described. Initially, the viewport's limits are defined within world-plane image 30 and the initial position of cursor 50 is recorded (boxes 60 and 62). Then, on a repetitive basis, the position of cursor 50 is tested (box 64). If it is found that cursor 50 has been moved (decision box 65), then the new cursor position is added to the initial cursor position (box 66), and a determination made as to whether the cursor is still within the viewport (decision box 68). If the cursor is found to still be within the viewport, then the cursor is moved as commanded (box 70). Of course, if no cursor move is found in decision box 65, the process merely recycles and the cursor position is again tested.

If it is found that the cursor is not within the viewport, it is then determined whether the cursor touches a viewport limit (decision box 72). If the answer is yes, then the intersecting limit is determined (box 74). If the answer is no, then the closest limit is determined (box 76) and the difference "d" is found between the new cursor position and the found limit (box 78). That distance d than enables access to the table of FIG. 3. Also, once the intersecting limit is found in box 74, the direction of pan is known (in the direction of the intersecting limit).

If the cursor is found to be coincident with a viewport limit, the pan rate and amount may be determined from the zero line of the left-most column of FIG. 3. If a distance d is found in box 78, that distance is utilized to address the pan rate table of FIG. 3 to find both the pan rate and the amount of movement per pan move. Those determinations are made in box 80, but before the pan action can be implemented, it must be determined whether the viewport limit is coincident with a world-plane limit. This is determined in decision box 82. If the answer is yes, no further pan is enabled in that direction, and the pan action is terminated (box 84). On the other hand, if a world plane limit has not been reached by a viewport limit, the viewport is panned by the amount and rate found from FIG. 3 (box 86).

At this stage, the keyboard output is interrogated to determine if a keystroke has commanded a cursor move (decision box 88). If yes, the routine recycles and again tests the cursor's position (box 64) etc. If no, the system interrogates whether a connected mouse movement input has been sensed. If none is sensed, then the viewport continues to pan at the same rate until it "hits" a world plane image boundary (boxes 82 and 86). If however, a mouse move is detected, the routine recycles to again test the cursor position (box 64) etc. It can thus be seen that if the user continues to move the mouse in the direction outside and away from a viewport limit, that the viewport will continue to pan at an ever increasing rate until it reaches a world-plane image limit. Obviously, there is a maximum pan rate which will not be exceeded, no matter how fast the user causes the mouse to move in the direction of the world-plane image limit.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. In a display apparatus able to pan a viewport image across a world-plane image, said viewport image having defined limits and exhibiting a cursor whose position is movable by user operated means, a method for providing a variable rate pan action of said viewport image, comprising the steps of:
   a. panning the viewport image at a preset rate in the direction of a viewport limit if the cursor has been moved to said viewport limit; and
   b. determining if the cursor has been moved beyond a viewport limit and the distance said cursor has been moved beyond said viewport limit; and
   c. panning said viewport in the direction of said limit at a faster rate which varies with said determined distance of said cursor beyond said viewport limit, said faster rate solely determinable from the position of said cursor in relation to said viewport limit.

2. The method of claim 1 comprising the further step of:
   e. terminating the panning of said viewport when a limit is reached of said world-plane image.

3. The method of claim 2 wherein said user operated means is a mouse.

4. The method of claim 3 wherein said user operated means is comprised plurality of keys on a keyboard.

5. In a display which includes a cursor and is adapted to pan a displayed image screen, the method comprising
   a. storing a world-plane image;
   b. selecting a portion of said world-plane image as a display screen image;
   c. displaying said display screen image;
   d. determining if said cursor has been moved past a limit of said display screen image into an undisplayed portion of said world-plane image;
   e. determining the distance said cursor extends past said limit; and
   f. panning said display screen image to display an undisplayed portion of said world-plane image, said panning occurring at a rate which is solely determinable from the determined distance of said cursor in relation to said limit.

6. The invention as defined as in claim 5 further comprising the step of:
   g. terminating said pan action when a limit of said display screen image positionally coincides with a limit of said world-plane image.

7. The invention as defined in claim 6 wherein a mouse is employed to control the cursor, the method further comprising, after step (f):
   h. continuing said pan of said display image screen at a rate determined by a mouse movement of said cursor, until said mouse again moves said cursor to establish a new movement rate.

8. A display apparatus for panning a viewport image across a world-plane image, said viewport image having defined limits and exhibiting a cursor whose position is movable by user operated means, said apparatus including means for providing a variable rate pan action comprising:
   ALU means responsive to said user moving said cursor to a limit of said viewport image, to pan said viewport image at a preset rate in the direction of said viewport limit; and
   logic means in said ALU means for enabling said ALU means to pan said viewport image at a faster rate in the direction of said viewport limit in response to movement of said cursor beyond said limit, said faster rate solely determined from the position of said cursor in relation to said limit, said logic means determining the distance said cursor has been moved beyond said viewport limit and enabling said ALU to pan said viewport in the direction of said limit at a rate which varies with said determined distance of said cursor beyond said viewport limit.

9. The apparatus as defined in claim 8 wherein said rate of pan is proportional to said determined distance of said cursor beyond said viewport limit.

10. The apparatus as defined in claim 9 further comprising:
    means for terminating the panning of said viewport when a limit is reached of said world-plane image.

* * * * *